United States Patent
Pridie

(10) Patent No.: US 11,919,259 B2
(45) Date of Patent: Mar. 5, 2024

(54) METHOD FOR FABRICATING A CENTRAL CAISSON OF AN AIRCRAFT WING MADE FROM COMPOSITE MATERIAL

(71) Applicant: Airbus Operations (S.A.S.), Toulouse (FR)

(72) Inventor: Jago Pridie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 283 days.

(21) Appl. No.: 17/161,062

(22) Filed: Jan. 28, 2021

(65) Prior Publication Data

US 2021/0229376 A1 Jul. 29, 2021

(30) Foreign Application Priority Data

Jan. 29, 2020 (FR) ...................................... 2000883

(51) Int. Cl.
| | | |
|---|---|---|
| B29C 70/46 | (2006.01) | |
| B29K 105/08 | (2006.01) | |
| B29K 307/04 | (2006.01) | |
| B29L 31/30 | (2006.01) | |

(52) U.S. Cl.
CPC ...... *B29C 70/462* (2013.01); *B29K 2105/089* (2013.01); *B29K 2307/04* (2013.01); *B29L 2031/3085* (2013.01)

(58) Field of Classification Search
CPC ..... B29C 70/46; B29C 70/462; B29D 99/001; B64C 1/26; B64C 2001/0072
See application file for complete search history.

(56) References Cited

U.S. PATENT DOCUMENTS

| | | | |
|---|---|---|---|
| 9,114,582 B2 * | 8/2015 | Blot | ........................ B64C 1/26 |
| 2004/0043196 A1 | 3/2004 | Willden et al. | |
| 2006/0231981 A1 | 10/2006 | Lee et al. | |
| 2011/0272852 A1 * | 11/2011 | Blot | ....................... B29C 70/46 |
| | | | 425/150 |
| 2014/0103585 A1 | 4/2014 | Coxon et al. | |

(Continued)

FOREIGN PATENT DOCUMENTS

| | | |
|---|---|---|
| EP | 3 530 444 A1 | 8/2019 |
| WO | WO 2010/040934 A2 | 4/2010 |

OTHER PUBLICATIONS

French Search Report for Application No. 2000883 dated Oct. 14, 2020.

(Continued)

*Primary Examiner* — Robert B Davis
(74) *Attorney, Agent, or Firm* — KDW Firm PLLC

(57) ABSTRACT

A method for fabricating a central caisson of an aircraft wing including a frame formed from U-section crossmembers. Formation of at least one crossmember includes forming a stack comprising at least one layer of resin film applied to a layer of dry fibers, pressing this stack to confer on it a U-section form and such as to compress the layers thereof, and pre-polymerization and/or polymerization of the resin of the stack. The manipulated fiber layers are layers of dry fibers, such that manipulation thereof by an automated machine may be effected for a reasonable cost and at a high throughput. Deposition of resin films carried by removable leaves, i.e., of which one of the faces is not adhesive, likewise facilitates manipulation by an automated installation.

20 Claims, 4 Drawing Sheets

(56) References Cited

U.S. PATENT DOCUMENTS

| | | | |
|---|---|---|---|
| 2015/0050503 A1* | 2/2015 | Hupka | B29C 70/465 |
| | | | 528/73 |
| 2015/0166743 A1 | 6/2015 | Restuccia et al. | |
| 2017/0297295 A1* | 10/2017 | Bhatnagar | B29C 43/02 |
| 2019/0256185 A1* | 8/2019 | Pridie | B29C 70/30 |

OTHER PUBLICATIONS

Anonymous: Composite materials guide: Manufacturing > Resin Film Infusion—NetComposites, Jan. 24, 2019 (Jan. 24, 2019).
European Search Report and Written Opinion for Application No. 21152880 dated Jun. 9, 2021.
European Office Action for Application No. 21152880 dated May 4, 2023.

* cited by examiner

METHOD FOR FABRICATING A CENTRAL CAISSON OF AN AIRCRAFT WING MADE FROM COMPOSITE MATERIAL

CROSS-REFERENCE TO RELATED APPLICATION

This application claims priority to French Patent Application FR 2000883 filed Jan. 29, 2020, the entire disclosure of which is incorporated by reference herein.

TECHNICAL FIELD

The disclosure herein relates to a method for fabricating a central caisson of an aircraft wing, such a caisson being installed in the lower part of the fuselage in order to provide the mechanical connection between the fuselage of the aircraft and the wings thereof.

BACKGROUND

The structure of an aircraft comprises, in particular, two subassemblies: on one hand a fuselage and on the other hand two wings which are connected by a structure referred to as the central wing caisson.

This central structure, which is in the shape of an essentially parallelepipedal sleeve, is installed in the lower part of the fuselage of the aircraft, in its central region. It extends transversely relative to this fuselage, in such a way that its lateral openings open out on either side of this fuselage, with each opening receiving an end of a wing such that the latter can be secured to the fuselage.

A caisson of this kind comprises a frame made of composite material, formed of a row of U-section crossmembers lined up next to one another so as to approximately delimit an upper wall, a lower wall and an upstream wall and a downstream wall, these being connected to one another so as to together delimit the parallelepipedal sleeve shape while lending it great stiffness.

The assembly is covered with an outer skin which is itself made of composite material and is obtained for example by winding fibers around the assembly formed by the crossmembers borne by a parallelepipedal mandrel. These fibers are impregnated with resin before everything is placed in a polymerization autoclave.

In general terms, the fabrication of the crossmembers must both conform to the limiting dimensional tolerances in order for the assembly to be able to be assembled and be implemented at high production rates. In practice, these crossmembers are fabricated by forming a stack of layers of preimpregnated fibers, one on another, with automated installation. This stack is then polymerized to form the crossmember. These layers of preimpregnated fibers are made of a commercially available material, usually termed 'prepreg' or 'prepeg', comprising a possibly woven layer of fibers preimpregnated over its entire thickness with thermostable resin.

Nonetheless, the creation of a stack of layers of preimpregnated fibers of the prepreg type with an automated installation proves to be problematic owing to the fact that an installation of this kind is costly and does not make it possible to achieve satisfactory production rates. This is due to the fact that the layers of fibers that are to be manipulated are sticky owing to being preimpregnated with resin, which significantly complicates their manipulation using an automated installation.

The disclosure herein relates to an optimized method for fabricating U-section crossmembers for fabricating a caisson of this type, making it possible to ensure a high rate of production.

SUMMARY

To that end, the disclosure herein relates to a method for fabricating a central caisson of an aircraft wing, comprising a frame formed from U-section crossmembers, wherein the formation of at least one crossmember comprises:
- a step of forming a stack comprising at least one layer of dry fibers and one layer of resin film applied to this layer of dry fibers;
- the application of a resin film to a layer of dry fibers being obtained by depositing a layer comprising a resin film carried by a removable leaf then removed from the removable leaf;
- a step of hot-pressing this stack using a press such as to conjointly confer on it a U-section form and compress the layers thereof.

With this solution, the manipulated fiber layers are layers of dry fibers, such that the manipulation thereof by an automated machine may be effected for a reasonable cost and at a high throughput. The deposition of resin films carried by removable leaves, i.e. of which one of the faces is not adhesive, simplifies manipulation by an automated installation.

The disclosure herein also relates to a method as defined, comprising a step of pre-polymerizing and/or polymerizing the resin present in the stack of pressed layers.

The disclosure herein also relates to a method as defined, wherein the pre-polymerizing step is integrated into the pressing step.

The disclosure herein also relates to a method as defined, wherein at least one layer of fibers is a layer of fabric made of woven fibers.

The disclosure herein also relates to a method as defined, comprising a step of cutting the planar stack of layers into multiple strips, each corresponding to one crossmember.

The disclosure herein also relates to a method as defined, comprising a step of installing multiple crossmembers onto a support mandrel, a step of winding composite fibers around the crossmembers borne by the mandrel, and of impregnation with resin to form an outer skin of the caisson, and a step of conjoined polymerization of the skin and of the crossmembers.

DETAILED DESCRIPTION

Figure 1:
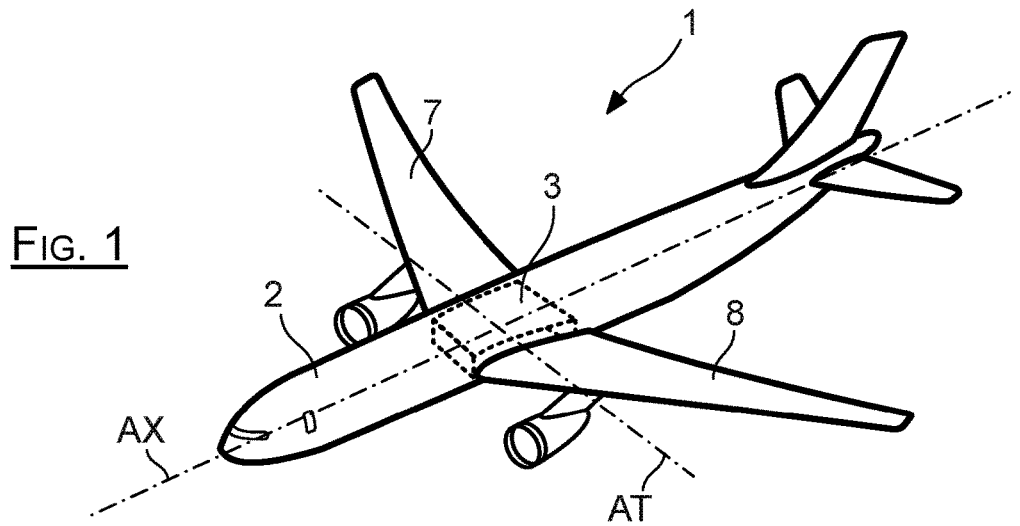
FIG. 1 is an overall perspective view of an aircraft containing a central wing caisson.

In FIG. 1, an aircraft 1 comprises a generally cylindrical fuselage 2 which extends in a longitudinal direction AX, and which includes, in the lower portion of its central region, a central wing caisson having reference number 3.

This central caisson 3 is in the general shape of an essentially parallelepipedal sleeve that extends transversely in a direction denoted AT, which is perpendicular to the longitudinal direction AX. Thus, this sleeve-shaped central caisson 3 comprises two opposite openings, located at each of its ends 4 and 6, and each opening out on either side of the fuselage to each receive one wing of the aircraft, with these wings, referenced 7 and 8, extending approximately in the transverse direction AT.

Figure 2:
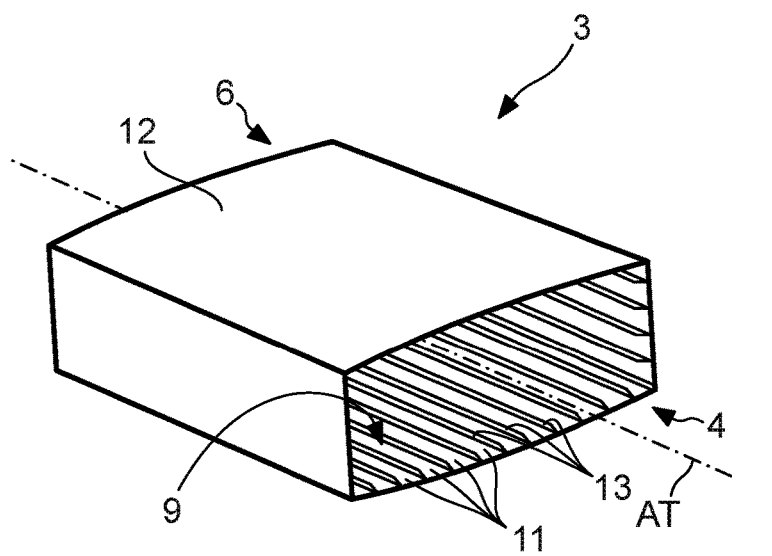
FIG. 2 is an overall perspective view of a central wing caisson shown in isolation.
Figure 3:
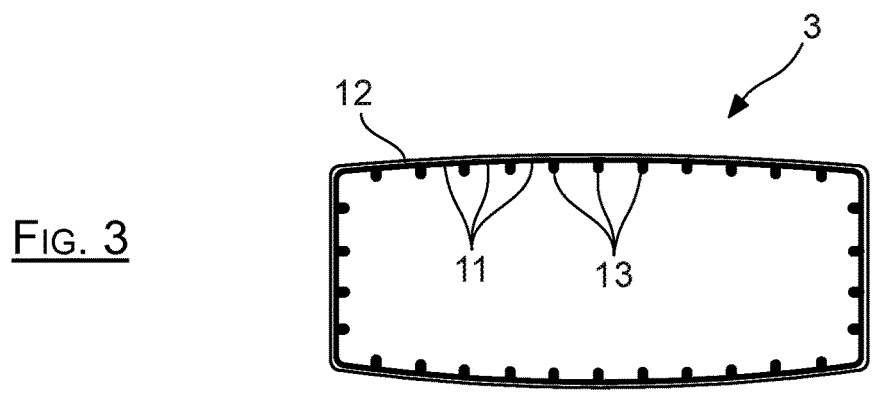
FIG. 3 is a view in longitudinal section of a central wing caisson.

As shown in FIGS. 2 and 3, this central caisson 3 comprises a frame 9, or carcass, formed of a set of U-section crossmembers 11 that are affixed to one another so as to together form a parallelepipedal sleeve shape. These crossmembers 11 are elements made of composite material, for example carbon fibers in a resin matrix, and the frame 9 that these crossmembers 11 form is tightly surrounded by a skin 12 that is itself made of composite material, this skin 12 conferring, to the assembly, the required mechanical cohesion.

The crossmembers 11 have their respective concavities oriented toward the interior of the caisson 3, such that each pair of two contiguous crossmembers 11 delimits, at their connection point, a stiffener rib 13 extending in the transverse direction AT and projecting toward the interior of the caisson 3. Thus, the various ribs 13 extend parallel to one another, and serve to increase the stiffness of the caisson.

Figure 4:
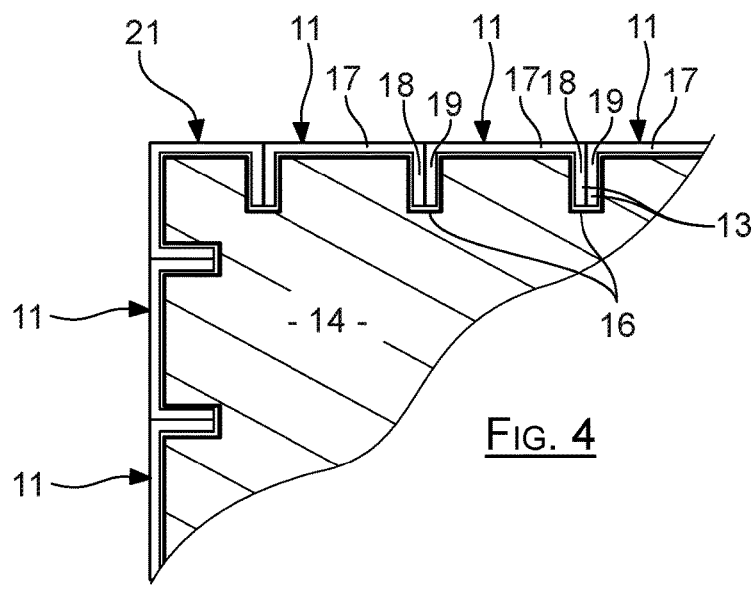
FIG. 4 is a view in longitudinal section of a portion of a central wing caisson during fabrication.
Figure 5:
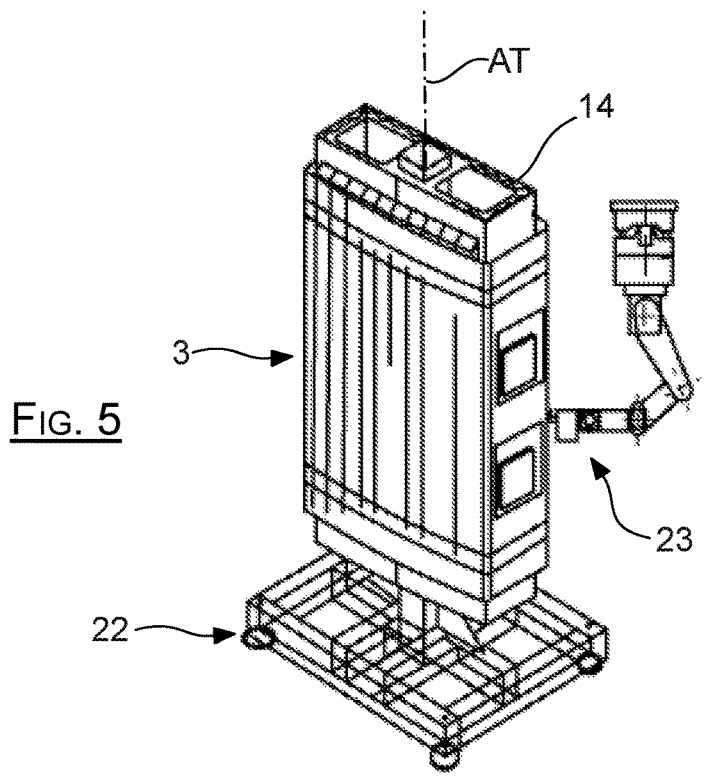
FIG. 5 is an overall perspective view of a phase of winding fibers around a caisson frame to form its skin.

This caisson is fabricated using, as shown in FIGS. 4 and 5, a generally parallelepipedal mandrel 14 that comprises, on its external faces, grooves 16 that correspond to the ribs 13 so as to constitute, for the crossmembers 11, a support that serves for arranging them and holding them in position to form and shape the frame 9. Specifically, each U-section crossmember 11 is affixed to the outer face of the mandrel 14.

Figure 6:
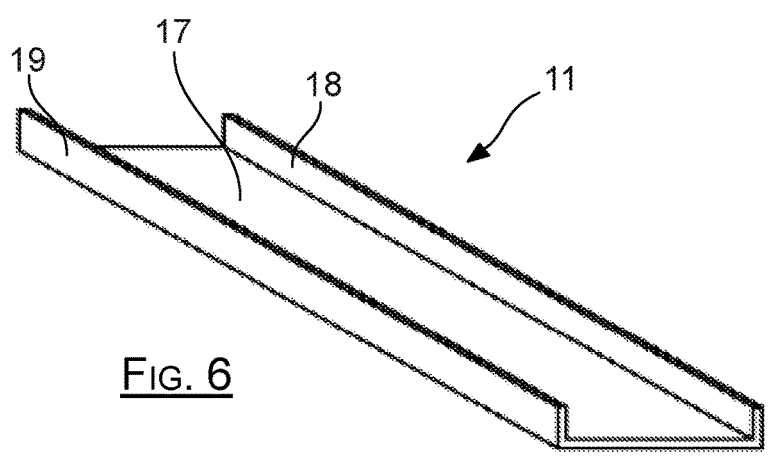
FIG. 6 is a perspective view of a crossmember used to form the frame of a caisson.

As illustrated in FIG. 6, each U-section crossmember 11 comprises a body 17 in the form of a wall in the form of an essentially planar strip from which there extend, laterally, two edges 18, 19, or branches, that are also in the form of planar strips perpendicular to the body 17 and parallel to one another.

As shown in FIG. 4, each U-section crossmember 11 is affixed to the mandrel 14 by inserting each of its two edges 18, 19 into two corresponding grooves 16 of this mandrel 14. At each corner of the mandrel 14, a corner crossmember 21 is installed, this having a specific C-shaped section that differs from the section of the crossmembers 11. More particularly, each corner crossmember 21 comprises a bottom that is not planar but is in the shape of an angle iron, that is to say with an L-section profile, from which there extend two opposite edges in the form of planar strips. As shown in FIG. 4, the corner crossmembers 21 serve for connecting the faces of the frame 9 to one another so as to constitute an assembly in the shape of a sleeve.

When all of the crossmembers 11 and 21 are in place on the mandrel 14, this mandrel is installed on a base 22, in accordance with an orientation according to which the axis AT extends vertically, the base being equipped with mechanical structure that allow this mandrel 14, with the crossmembers that are mounted thereon, to rotate about its axis AT, extending vertically during this operation.

At this stage, as shown in FIG. 5, carbon fibers are wound around the assembly so as to form the skin 12 of the central caisson 3. This operation is effected using an unwinding head 23 that can be moved vertically, the mandrel 14 then rotating about its axis AT. The fibers wound around the crossmembers borne by the mandrel are for example carbon fibers impregnated with resin. These may also be dry carbon fibers, the resin then being applied after winding of the fibers.

Once the skin has been formed, the assembly is placed in an installation of the autoclave type in order to polymerize the resin of the skin with that of the crossmembers so as to constitute a caisson having optimum mechanical cohesion and hence mechanical strength suitable for its intended use.

According to the disclosure herein, the composite-material crossmembers 11 that are used are fabricated by first forming a stack that contains layers of carbon fiber fabrics and resin films in alternation, then hot-pressing this stack to confer on it its U-section shape while compressing these layers against one another in order, among other things, that the resin effectively impregnates the fabric layers over their entire thickness.

Figure 7:
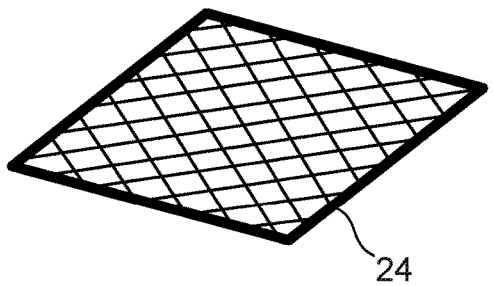
FIG. 7 is a perspective view of a planar layer of fibers shown in isolation.
Figure 8:
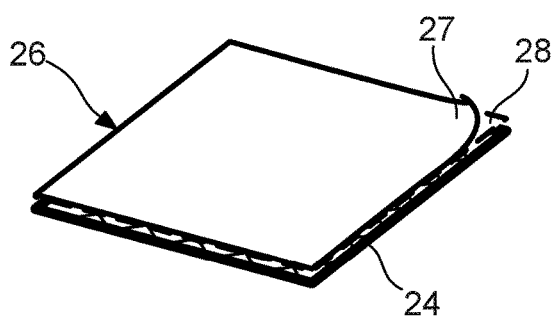
FIG. 8 is a perspective view of the application, onto a planar fiber layer, of a film of resin carried by a removable leaf.
Figure 10:
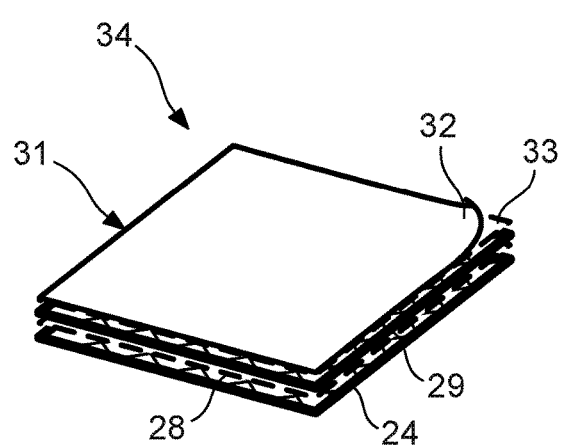
FIG. 10 is a schematic representation in perspective of the ongoing stacking of layers for the fabrication of the crossmembers according to the disclosure herein.

In FIG. 7, a planar dry fiber layer 24 is deposited onto a planar support (not shown), advantageously using a robotized installation. In this example, this is a constant-thickness carbon fiber woven, advantageously a multi-axial woven. The application of a layer of dry fibers, and not one preimpregnated with resin, such as the prepreg material, facilitates the automated deposition using a robotized system, owing to the fact that, unlike a layer that is preimpregnated with resin, a dry layer is not sticky.

Figure 9:
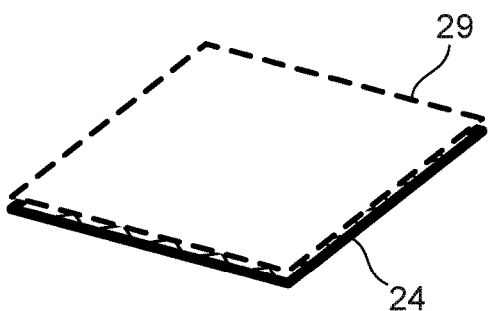
FIG. 9 is a perspective view of a film of resin applied to a layer of fibers after removal of the removable leaf.

A layer 26 of resin film is deposited onto this layer 24, advantageously using a robotized installation. This layer 26 comprises a removable leaf 27 bearing, on its lower face, a resin film 28 of predetermined and constant thickness. As shown schematically in FIG. 7, once the layer 26 is in place on the layer 24, the removable leaf 27 is removed, while the resin film 28 remains in place on the upper face of the layer of fibers 24, as shown in FIG. 9. Another layer of dry fibers 29 can then be deposited on the resin film 28, in order to deposit on the latter another layer 31 of resin film. This layer 31 also comprises a removable leaf 32 which is removed in order to leave in place a resin film 33 on the layer of fibers 29.

This results in a planar stack of layers comprising a certain number of layers of fibers, with a resin film interposed between each pair of consecutive layers of fibers. The number of layers of fibers depends on the mechanical dimensioning of the crossmember, and the stacking of layers is done in entirely automated fashion or in semi-automated fashion.

Alternatively, the resin is supplied in the form of a liquid instead of being supplied in the form of films carried by leaves, which can be adapted for certain configurations of automated installations.

Figure 11:
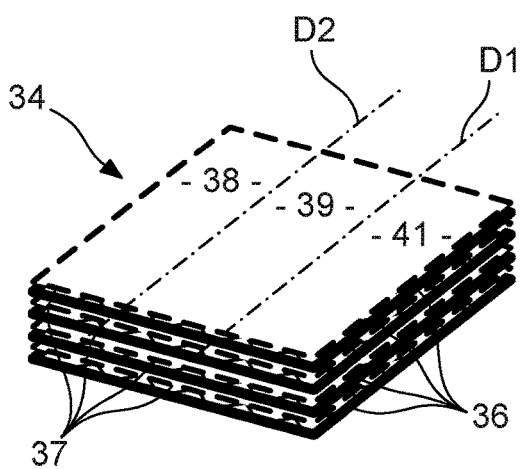
FIG. 11 is a schematic representation in perspective of a finished planar stack of layers prior to cutting for the purpose of forming multiple crossmembers.

In FIG. 11, a finished stack of layers, which is given the reference 34, thus comprises an alternating sequence of dry fiber layers 36 and resin films 37, this stack having a square contour in this example. Two parallel straight cuts D1 and D2 are then created in this stack 34, in order to cut through its entire thickness so as to give rise to three rectangular-contour stacks that are intended to form three crossmembers 11, these three strips being given the references 38, 39 and 41.

Figure 12:
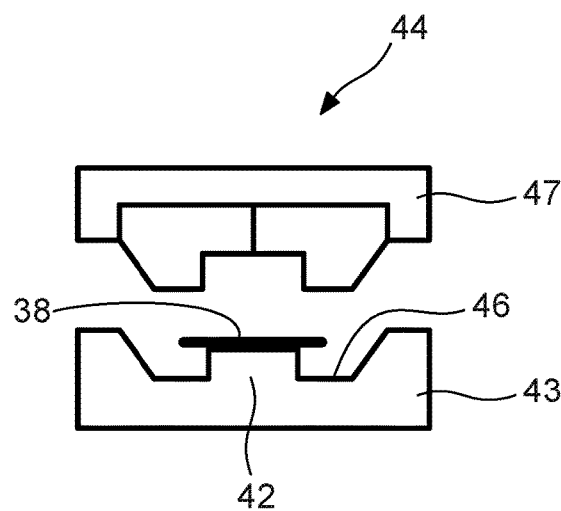
FIG. 12 is a view in section of a press used for forming a U-section crossmember made of a composite material in accordance with the disclosure herein.

The strip 38 is then installed on a central portion 42 of a lower cavity 43 borne by a lower part of a press 44, represented schematically in FIG. 12. This cavity 43 comprises a bottom 46 from which the central portion 42 projects. This central portion 42 projects from the bottom 46, having a rectangular general shape that is substantially narrower than the strip 38, and longer than the latter.

As shown in FIG. 12, the strip 38 is installed in a manner centered on the central portion 42, in order that the long edges of this rectangular strip extend laterally beyond the central portion 42 so as to be opposite the bottom 46.

The upper part of the press 44 bears an upper cavity 47, located vertically opposite the lower cavity 43, and also has a relief form which matches the form of the lower cavity 43.

Figure 13:
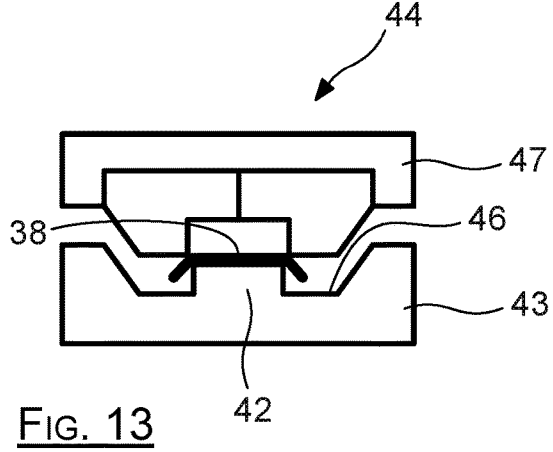
FIG. 13 is a view in section of a press during forming of a crossmember according to the disclosure herein.
Figure 14:
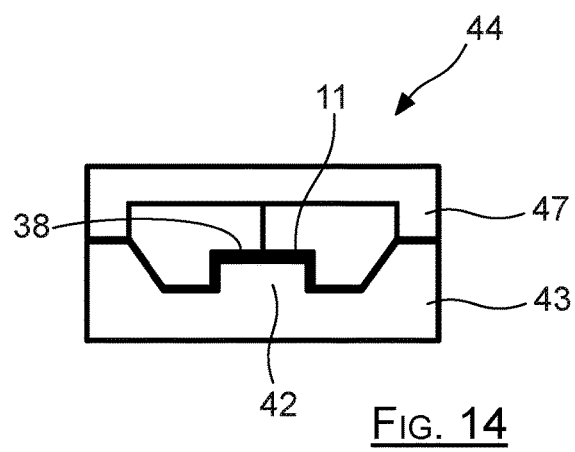
FIG. 14 is a view in section of a press finishing the forming of a crossmember according to the disclosure herein.

Once the assembly is in place, the press 44 is actuated so as to lower the upper cavity 47 toward the lower cavity 43, as shown in FIGS. 13 and 14. The start of this lowering causes lowering of the edges of the strip 38 projecting laterally past the central portion 42, as shown in FIG. 13, so as to confer a U-section shape on the strip of stacked layers.

At the end of the lowering, as shown in FIG. 14, the shaping of the strip 38 is complete, and the strip has the desired U-section. The press 44 is then controlled so as to increase the pressure exerted by the upper cavity 47 on the lower cavity 43, as a result of which it is possible to compress the various constituent layers of the strip 38 so as to constitute an assembly that is both compact and essentially devoid of air bubbles.

It is provided that the cavities 43 and 47 be heated, to make the resin more liquid in order to improve penetration thereof within the layers of fabric, that is to say its infusion during the shaping operation. This heating also gives rise to pre-polymerization of the resin in order to partially solidify the obtained crossmember 11.

The strips 39 and 41 are then processed in the same way, so as to form two other preformed, U-section crossmembers 11. When the necessary number of crossmembers has been fabricated in this way, these crossmembers are installed on the mandrel 14 so as to constitute the frame 9 of the central caisson that is to be fabricated.

When all the crossmembers 11 are in place on the mandrel 14, the mandrel is set in rotation about the vertical axis AT, so as to form, around the crossmembers, a skin of fibers by external winding. Resin may be directly integrated into this skin, by impregnation of the wound thread directly during winding thereof, or by any other common technique in this field.

When the assembly formed by the frame 9 borne by the mandrel 14 and surrounded by the skin 12 is ready, this assembly is installed in an autoclave-type system to proceed with co-polymerization of the resin of the crossmembers 11 and of the resin of the skin 12, in order to cure these different components conjointly so that the assembly has appropriate mechanical cohesion, and in so doing satisfactory mechanical strength. In other words, the fact of proceeding with the conjoined polymerization of the crossmembers and the skin in an autoclave allows these elements to effectively bond to one another to form a general structure that has high mechanical strength.

In the example described, the disclosure herein is applied to the fabrication of a central wing caisson. However, the disclosure herein can also be applied more generally to the fabrication of components comprising stiffeners in the form of U-section crossmembers covered with a skin that is polymerized in an autoclave.

In general terms, the disclosure herein makes it possible to fabricate U-section, composite-material crossmembers at high throughput rates and at low cost. The fact of handling only dry fiber layers and resin film layers carried by removable leaves considerably simplifies the automation structure necessary for handling these layers, since these layers are not sticky.

By contrast, the fabrication of these crossmembers using prepreg-type layers—which are inevitably sticky since they are impregnated with resin—requires automated handling that is significantly more complex and costly and that have much lower production rates.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for fabricating a central caisson of an aircraft wing, the central caisson comprising a frame formed from U-section crossmembers, wherein formation of at least one of the U-section crossmembers comprises:
    providing one or more layers of dry fibers;
    providing a layer of a resin, which is in a form of a resin film and comprises a removable leaf that bears the resin film;
    applying the layer of the resin to the one or more layers of the dry fibers to form a stack;
    removing, when the layer of the resin is in place on the one or more layers of the dry fibers, the removable leaf from the resin film; and
    hot-pressing the stack using a press to conjointly confer on the stack a U-section form and to compress the layers of the stack.

2. The method of claim 1, comprising pre-polymerizing and/or polymerizing the resin present in the stack.

3. The method of claim 2, wherein the pre-polymerizing of the resin is integrated into using the press.

4. The method of claim 1, wherein at least one of the one or more layers of the dry fibers is a layer of fabric made of woven fibers.

5. The method of claim 1, wherein the stack is a planar stack, the method comprising cutting the planar stack into multiple strips, each strip of the multiple strips corresponding to one crossmember.

6. The method of claim 1, comprising:
- installing a plurality of the U-section crossmembers onto a support mandrel;
- winding fibers around the plurality of the U-section crossmembers installed on the mandrel;
- impregnating the fibers and the plurality of the U-section crossmembers with a resin to form an outer skin of the caisson; and
- carrying out conjoined polymerization of the resin in the outer skin and of the resin in the plurality of the U-section crossmembers.

7. The method of claim 6, wherein the fibers wound around the plurality of the U-section crossmembers are composite fibers and/or carbon fibers.

8. The method of claim 1, wherein the dry fibers are carbon fibers.

9. The method of claim 4, wherein the woven fibers of the fabric are carbon fibers.

10. A method for fabricating a central caisson of an aircraft wing, the central caisson comprising a frame formed from U-section crossmembers, wherein formation of at least one of the U-section crossmembers comprises:
- providing layers of dry fibers;
- providing layers of a resin, each of which are in a form of a resin film;
- assembling the layers of the dry fibers with the layers of the resin to form a stack;
- arranging the stack on a lower part of a press, the lower part of the press having a first cavity formed therein;
- arranging an upper part of the press above the lower part of the press, the upper part of the press having a second cavity formed therein;
- actuating the press to sandwich the stack between the upper part of the press and the lower part of the press, such that the stack has a U-section shape.

11. The method of claim 10, wherein the stack comprises the layers of dry fibers and the layers of the resin that are assembled in an alternating sequence.

12. The method of claim 10, comprising controlling a pressure exerted on the stack within the press to compress the layers of dry fibers and the layers of the resin within the stack to form a U-section crossmember that is essentially devoid of air bubbles.

13. The method of claim 10, comprising heating the press to pre-polymerize and/or polymerize the resin within the stack to aid in penetration of the resin within the layers of the dry fabric.

14. The method of claim 10, wherein each layer of the resin comprises, when being assembled with the layers of the dry fibers, the resin film and a removable leaf, the method comprising removing the removable leaf of each of the layers of the resin before a subsequent one of the layers of the dry fibers is deposited thereon.

15. The method of claim 10, wherein the stack is a planar structure.

16. The method of claim 10, wherein the stack comprises one of the layers of the resin between each of the layers of the dry fibers.

17. The method of claim 10, wherein one or more of the layers of the dry fibers are in a form of a fabric comprising woven carbon fibers.

18. The method of claim 10, wherein the dry fibers are carbon fibers.

19. The method of claim 10, comprising:
- forming a plurality of the U-section crossmembers;
- installing the plurality of the U-section crossmembers onto a support mandrel;
- winding fibers around the plurality of the U-section crossmembers installed on the mandrel;
- impregnating the fibers and the plurality of the U-section crossmembers with a resin to form an outer skin of the caisson; and
- carrying out conjoined polymerization of the resin in the outer skin and of the resin in the plurality of the U-section crossmembers.

20. The method of claim 19, wherein the fibers wound around the plurality of the U-section crossmembers are composite fibers and/or carbon fibers.

* * * * *